UNITED STATES PATENT OFFICE.

DAVID J. OGILVY, OF CINCINNATI, OHIO.

PROCESS OF MAKING PRINTING-INK.

SPECIFICATION forming part of Letters Patent No. 587,852, dated August 10, 1897.

Application filed January 2, 1894. Serial No. 495,383. (No specimens.)

*To all whom it may concern:*

Be it known that I, DAVID J. OGILVY, a citizen of the United States, and a resident of the city of Cincinnati, in the county of Hamilton and State of Ohio, have invented or discovered a new and valuable Process of Making Printing-Ink and the Ink Thereby Produced, of which the following is a specification.

The several features of my invention and the various advantages resulting from their use, conjointly or otherwise, will be apparent from the following description and claims.

The material to be treated, first, consists, essentially, of the color or pigment, which may be lamp or carbon black or any of the ordinary blacks of commerce, and, secondly, the menstruum or substance with which this black pigment is to be mixed, and may be any of the oils, fats, rosins, or pitches.

First, as to the pigment. This consists of lampblack or gasblack or other suitable black.

Second, as to the menstruum or substances with which this black pigment is to be mixed. The materials for this purpose may be of the oils, fats, rosins, or pitches.

The process is as follows: For an ordinary black ink the proportions usually mixed are two thousand pounds of ordinary rosin, eight thousand pounds of the rosin or other suitable oil, and fifteen hundred pounds of the black pigment, but these proportions are approximate, depending on the season, the requirements of the trade, and the consistency of the oils used.

By the term "suitable oils" is meant any of the oils ordinarily used for this purpose, such as rosin, petroleum, or linseed oils.

The ingredients (black pigment, oil, and rosin) in substantially the proportions named are placed within an appropriate vessel. This vessel is connected to a suitable condenser. Into the mixture I inject or introduce superheated steam, so that the mixture will be violently and thoroughly agitated until the result is satisfactory, which may be known by drawing a sample or upon inspection by one having become proficient in this process. When sufficiently treated, the product is passed, if desired, through a strainer or grinding apparatus into vessels for storage or for further treatment. The addition of toning or tinting material or material for decreasing or increasing the viscosity and consistency may be made by adding the same either before or after the application of the steam, as aforementioned; but the time of making such addition will depend upon the stability of the material to be added. The distillate from such process is collected and utilized.

When desired, the black pigment and the oil may be mixed and subjected to the action of the steam, as aforementioned, and the rosin added thereafter, or, again, the rosin may be charged with the blacks. This is obviously desirable and advantageous in many cases.

The rosin or other resinous substances may be omitted entirely and the necessary consistence given to the intermixed oil and black by continued steaming.

Among the many advantages arising from my invention are the following, to wit: A great saving of time and labor is effected, as the varnish is produced and deodorized and the black (pigment) intermixed and levigated all in one operation. The necessary apparatus is simpler and cheaper than the machinery, &c., ordinarily required in the manufacture for such purposes.

What I claim as new and of my invention, and desire to secure by Letters Patent, is—

1. The process of producing printers' ink which consists in placing in a proper still a black pigment, together with a suitable oil or oils and resinous substances in the proportions substantially as described, subjecting the mass to the action of injected superheated steam and at the same time conducting off and condensing the volatile products therefrom; substantially as and for the purposes specified.

2. The process of making printing-ink which consists in placing in a suitable vessel a mixture of black pigment and suitable oil or oils, and injecting superheated steam into the mixture until the mixture is brought to a fine state of division and of the proper consistency, and condensing the more volatile products in the usual manner.

DAVID J. OGILVY.

Attest:
A. S. LUDLOW,
K. SMITH.

It is hereby certified that in Letters Patent No. 587,852, granted August 10, 1897, upon the application of David J. Ogilvy, of Cincinnati, Ohio, for an improvement in "Processes of Making Printing-Ink," errors appear in the printed specification requiring correction, as follows: In lines 19 and 25, the word "rosins" should read *resins;* and that the said Letters Patent should be read with these corrections therein that the same may conform to the record of the case in the Patent Office.

Signed, countersigned, and sealed this 24th day of August, A. D. 1897.

[SEAL.]

WEBSTER DAVIS,
*Assistant Secretary of the Interior.*

Countersigned:
A. P. GREELEY,
*Acting Commissioner of Patents.*